United States Patent [19]

Bird

[11] Patent Number: 4,658,930
[45] Date of Patent: Apr. 21, 1987

[54] VIBRATOR FOR SEISMIC GEOPHYSICAL PROSPECTING

[75] Inventor: James M. Bird, Tulsa, Okla.

[73] Assignee: Industrial Vehicles International, Inc., Tulsa, Okla.

[21] Appl. No.: 425,436

[22] Filed: Sep. 28, 1982

[51] Int. Cl.⁴ .................. G01V 1/133; G01V 1/02
[52] U.S. Cl. ................................ 181/113; 367/189; 251/129.05; 251/129.08; 181/401
[58] Field of Search ............... 404/113; 181/108, 111, 181/113, 114, 117, 119, 121, 401; 366/116, 124; 367/189; 251/129.05, 129.08

[56] References Cited

U.S. PATENT DOCUMENTS

| | | |
|---|---|---|
| 3,106,982 | 10/1963 | Wade .................................. 181/108 |
| 3,283,846 | 11/1966 | Lindall et al. ...................... 181/114 |
| 3,789,951 | 2/1974 | Silverman . |
| 3,860,087 | 1/1975 | Silverman . |
| 3,983,957 | 10/1976 | Silverman ........................... 181/114 |
| 4,492,285 | 1/1985 | Fair et al. ............................ 181/114 |

Primary Examiner—Salvatore Cangialosi
Assistant Examiner—Ian J. Lobo
Attorney, Agent, or Firm—Head Johnson Stevenson

[57] ABSTRACT

An improved vibrator system for seismic geophysical prospecting, comprising a sealed chamber having two parts which reciprocate axially with respect to each other providing a sealed space between the two parts. One part connected to a baseplate, the other part connected to a reaction mass. Means for injecting into the sealed space a pulsating flow of high pressure fluid in response to which the two parts will vibrate with respect to each other. At least a single output opening comprising a valve, the cross-sectional area of which is a function of the displacement between the two parts of the vibrator.

22 Claims, 9 Drawing Figures

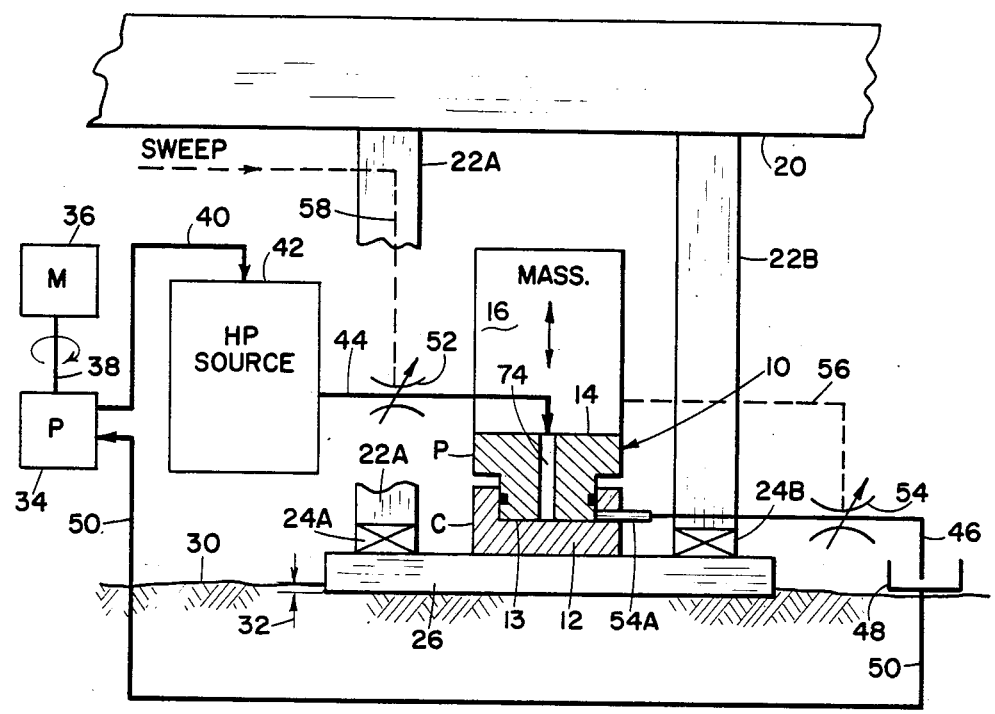
Fig. 1
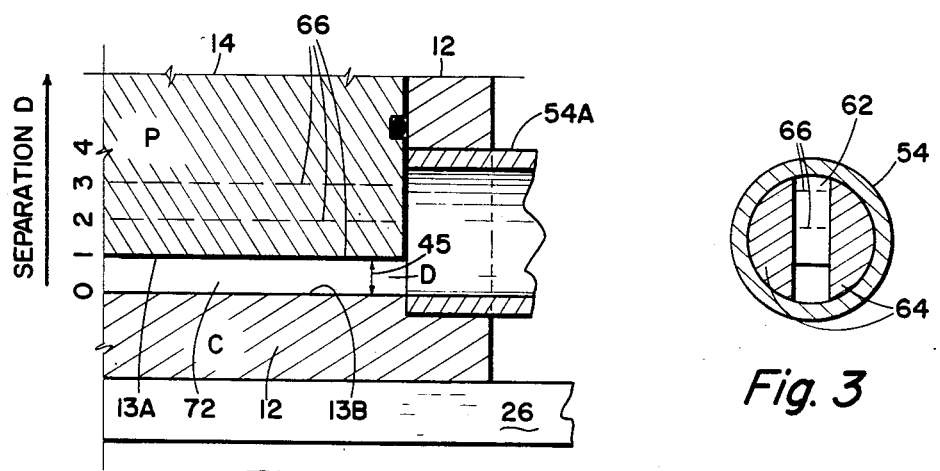
Fig. 2
Fig. 3

VIBRATOR FOR SEISMIC GEOPHYSICAL PROSPECTING

BACKGROUND OF THE INVENTION

1. Field of the Invention

This invention lies in the field of seismographic vibrators for imparting to the earth a pulsating pressure of selected frequency and time duration.

2. Description of the Prior Art

In the prior art there are a number of patents covering designs of electro-hydraulic vibrators which vary over a very wide range of design and construction. Most of these vibrators have very intricate construction and have mechanical systems which are not simple and which at the various frequencies at which the vibrators are operated can provide considerable trouble with resonances and phase shifts.

SUMMARY OF THE INVENTION

It is a primary object of this invention to provide a simple, powerful, small electro-hydraulic vibrator unit that has a phase characteristic vs. frequency which is simple and regular, and that can be made to follow the injected pressurized fluid with greater fidelity than can those of the prior art design.

It is a further object of this invention to provide a very small, simple, vibrator unit such that can be mounted directly on the base plate, so as to make the moving system of minimum mass.

It is a still further object of this invention to make the vibrator so small that a plurality of vibrators can be mounted in a pattern onto the base plate, or on separate base plates, so that by multiple point pulsating pressures the base plate can be made to move as a unit with minimum structural complexity.

It is a still further object of this invention to provide one or more of the vibrator units in a pattern on the base plate with a simplified structure tying the stationary parts of the vibrator in unison and providing means to lock these parts of the vibrator to the truck mass prior to the initiation of the vibration procedure.

These and other objects are realized and the limitations of the prior art are overcome in this invention by providing a simple two-part vibrator unit comprising a shallow cup-like cylinder and a shallow piston of substantial cross sectional area, which are adapted to reciprocate with respect to each other and including sealing means so as to provide a closed space between the two parts as they separate.

Means are provided for injecting high pressure fluid from a source or accumulator into the space between the two vibrating parts. An outlet opening is provided including a valve, the opening of which, varies in area in accordance with a function of the displacement between the two parts of the vibrator.

In other words, with the cylinder part fastened to the base plate, for example, and the piston inserted into the cylinder, when fluid is injected into the space between the piston and cylinder the two will separate. A reaction mass is provided to press the base plate against the earth, and to minimize the upward movement of the piston and increasing the downward movement of the cylinder, and therefore increasing the downward force exerted by the base plate.

Any selected relationship can be provided between the separation of piston and cylinder, and the area of the outlet pipe from the sealed space inside the vibrator. One preferred arrangement is to provide an outlet area which is a linear function of the displacement between the piston and the cylinder. Of course, other functions of displacement are possible. The pressurized fluid which is allowed to pass from the inner space of the vibrator through the outlet valve goes to a sump, from which it is picked up by the inlet to a compressor where it is then compressed to a selected high pressure, and accumulated ready for reinjection into the vibrator.

One embodiment of the invention utilizes a separate reaction mass applied to the piston. A further improvement can be made by providing means to lock the piston to the truck or other vehicle which carries the vibrator. Thus, the truck or at least a part of the mass of the truck, becomes the reaction mass for the vibrator. Since this mass is many times larger than is possible to be provided by the self-contained reaction mass, more energy can be driven into the earth than was heretofore possible by the conventional construction of vibrators with self-contained reaction mass. Of course, a separate reaction mass can be used in addition to the truck mass. Also while the truck mass is used as the reaction mass, it can also be used with compliances to hold the base plate against the earth.

While I speak of a design in which the piston is attached to the reaction mass, and the cylinder is attached to the base plate, the vibrator can be designed equally well with the two parts of the vibrator interchanged; that is, the cylinder can be attached to the mass, and the piston to the base plate. This description is only for illustrative purposes, and is not meant to be a limitation.

A still further object of this invention is to provide a vibrator system in which the flow of pressurized fluid through the inlet servo valve and the vibrator is unidirectional, that it passes through the servo valve once, into the vibrator, and ported out through a separate valve to the sump, and not through the inlet valve.

It is a still further object of this invention to control the flow of pressurized fluid into the vibrator as a function of time, and out of the vibrator as a function of displacement between the piston and cylinder.

BRIEF DESCRIPTION OF THE DRAWINGS

These and other objects and advantages of this invention and a better understanding of the principles and details of the invention will be evident from the following description taken in conjunction with the appended drawings in which:

FIG. 1 represents a schematic view of one embodiment of this invention.

FIGS. 2, 3, 3A and 4 represent to enlarged scale one portion of FIG. 1, dealing with the outlet opening from the inner space of the vibrator.

DESCRIPTION OF THE PREFERRED EMBODIMENT

Figure 3A:
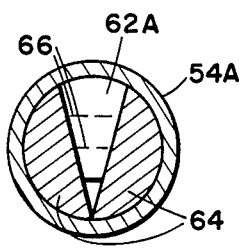

Referring now to FIGS. 1, 2, 3, 3A and 4, FIG. 1 represents a schematic view of one embodiment of this invention. A vibrator containing two parts indicated as a piston P,14 and a shallow cylinder C,12 are collectively indicated in general by the numeral 10. The two parts are sealed together and the opposing faces 13A, 13B of the two parts comprise the walls of a sealed space 72 between the two parts.

While the piston and cylinder are shown with the cylinder attached to the base plate 26, it is of course possible to invert the vibrator and place the piston in contact with the base plate and the cylinder then will be in contact with the reaction mass 16.

The general construction of the base plate 26 is conventional. The columns 22A and 22B support the truck on the base plate through compliances 24A and 24B. Although not shown, but well known in the art, the conventional hydraulic system is provided for lifting the truck above the ground so as to place its weight on the base plate.

A high pressure fluid container, source, or accumulator 42 is provided for storing a substantial volume of pressurized fluid. Normally, for electrohydraulic vibrators, the fluid would be a liquid such as a light oil, although for many situations, the vibrator itself need not be a piston and cylinder arrangement, but can be a closed flexible bag, etc. In this case, compressed gas can be the fluid powering the vibrator.

The important thing about this vibrator system is that the fluid injected into the vibrator is controlled by a valve which has unidirectional flow. That is, the high pressure fluid is controlled by a servo valve to inject fluid into the vibrator, but not to return the pressurized fluid from the sealed space 72 in the vibrator. The fluid after injection into the space and expansion of the vibrator, is ejected out of the sealed space through a valve 54 of variable area such that during the cycle of injection, a part of the flow passes through the valve to the sump 48 although there is sufficient fluid in the sealed space to create a pulsating force onto the base plate and therefore, onto the earth. As the inflow of pressurized fluid continues, the outflow becomes greater such that at the end of the injection period, substantially all of the fluid injected, is ejected from the sealed space, and another cycle of injection begins.

In FIG. 1 the input control valve or servo valve is indicated schematically by numeral 52. The dash line 58 indicates the electrical control signal to the valve 52 which controls fluid flow from the high pressure accumulator or source 42 via line 44 to the vibrator 10. The output of the vibrator is the pipe 54A which is positioned with respect to the vibrator parts as will be discussed in connection with FIG. 2. The flow area of this valve is indicated schematically by numeral 54. The dash line 56 indicates a control on the opening of the valve 54, which is a function of the position or separation 45 of the two parts 14 and 12 of the vibrator unit. This will be made clear in discussion of FIGS. 2, 3, 3A and 4. The outflow from the valve 54 goes by line 46 to a sump 48, and is collected through line 50 to the input to the pump 34, which is driven by shaft 38, from a motor or engine 36. The high pressure outlet of the pump 34 goes by line 40 to the accumulator 42.

Referring now to FIGS. 2, 3, 3A and 4, there is shown in FIG. 2 to an enlarged scale, a part of the lower portion of the vibrator 10 of FIG. 1. This shows a corner of the piston 14, the lower corner of the cylinder 12 mounted on the base plate 26 and a short tubular connection 54A which is positioned in the side of the cylinder with particular attention to the bottom surface 13B of the space 72, between the two surfaces 13A and 13B. In FIG. 3 is shown a cross section of the valve 54. The internal cross section of the pipe 54A has a central, or diametrical opening in the form of a rectangle 62. The bottom of the rectangle 62 is flush with the inside of the pipe or tubing 54A, which is at the level of the surface 13B of the cylinder.

Several positions, or a scale of dimension has been prepared as an ordinate, with dimensions 0, 1, 2, 3, 4 and corresponding lines 66 drawn which have been shown also in FIG. 3 as dash lines 66. As the piston surface 13A approaches and closes on 13B, the space 72 becomes zero in volume, and the opening of the valve 54 is 0. As the piston moves upwardly to position 1, then a small opening between the two portions 64 will be available for outflow of liquid from the space 72 through the valve 54. As the vertical dimension of the space 72 increases, the opening of the valve 54 correspondingly increases.

Figure 4:
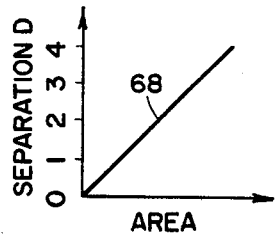

FIG. 4 shows a straight line curve 68 passing through the origin 0. The ordinate is labeled D, the separation of the two faces 13A and 13B. The abscissa is labeled area. The characteristic 68 shows that the area goes up linearly with the dimension D of the separation.

Of course, this is only one type of characteristic of the valve. It is possible to design the shape of the valve so that it will have a non-linear relationship between opening area and displacement. One such shape providing a non-linear relationship is shown in FIG. 3A. Thus, the operating characteristic of the vibrator can be altered as desired by change in shape of opening 62.

While the prior art has shown the use of a closed cylinder with a small outlet opening or leak, this is not the same kind of operation. The prior art shows only a constant area of opening of the leak. It is the design of the characteristic of FIG. 4, for example, or another type of characteristic, based upon the area as a function of the separation of both faces of the vibrator space that is important.

In conventional vibrator systems, which have self-contained reaction masses, the weight of the truck 20 is used to press the base plate onto the earth. This is shown in FIG. 1, which is conventional in having a self-contained reaction mass 16 attached to the piston 14. The truck 20 presses on columns 22A, 22B, which press on compliances 24A, 24B, which are attached to the base plate 26.

Figure 5:
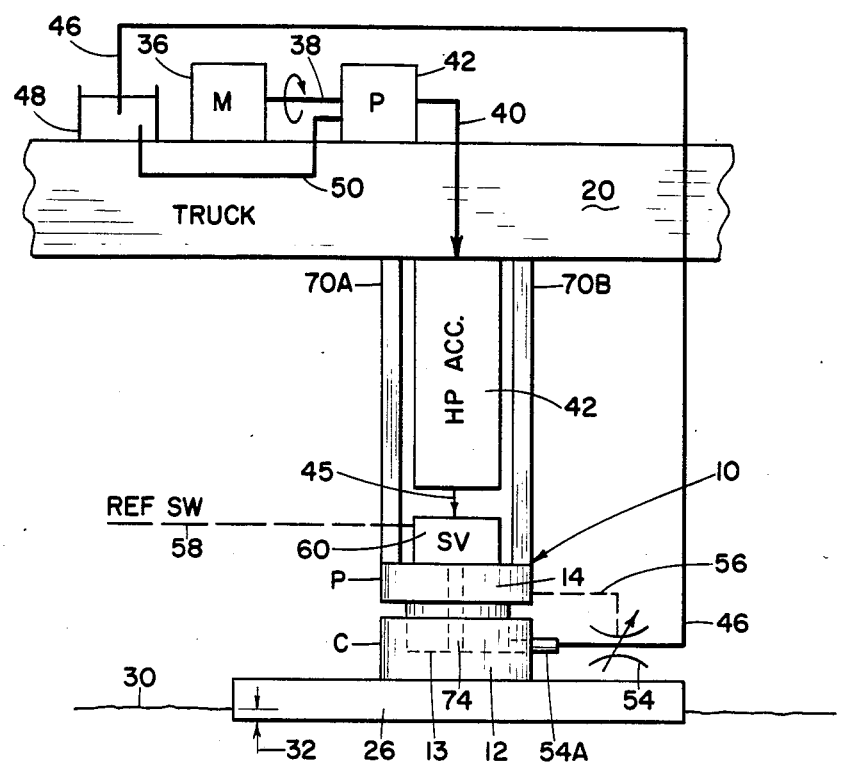
FIG. 5 represents an improved embodiment of the vibrator system utilizing the truck as the reaction mass.

Referring now to FIG. 5 there are further details shown schematically, which can make this improved vibrator more efficient and effective. Again, the truck body 20 is shown above the base plate 26 which is positioned on the surface 30 of the earth 28.

Means 70A and 70B are shown schematically as a structural device which is attached to the top of the vibrator by means well known, which need no further explanation. This structure 70A-70B is also attached again by any means desirable to the truck body 20, so that while the vibrator is operating and the truck weight has been pressed against the base plate through the structure 70A, 70B and vibrator 10, the truck mass 20 will be the reaction mass for the vibrator. Thus, the conventional reaction mass 16 shown in FIG. 1 would not be necessary. The high pressure accumulator 42 normally is mounted on top of the truck bed. However, since the vibrator itself, is now tied to the truck, the accumulator 42 can now be mounted just above the servo valve 60, and the high pressure fluid line 40 from the pump 42 will connect to the accumulator. Also, the accumulator now is tied to the vibrator by a very short pipe 45 having minimum volume of liquid, the mass and compressibility of which is often a disturbing problem. However, by making this moving volume of fluid small, this problem is minimized.

In FIG. 5 as compared to FIG. 1, the valve 52 is now shown as a conventional servo valve 60 which receives electrical signals over the line 58, carrying the reference sweep signal, which is to control the vibrator, and the input force pattern into the earth.

While I again show the outlet valve 54 of the design shown in FIG. 2, this is only for convenience, and it will be clear that any other type of contruction of a valve whose opening is to be some desired function of the separation D of the two parts of the vibrator can be used.

I contemplate also that the outlet valve 54 can be an electro-hydraulic valve similar to the conventional servo valve which is driven by an electrical signal derived from the input reference sweep signal on line 58. It can also be an electrical signal derived from the physical separation of the two faces 13A and 13B of the vibrator.

It will be clear that in steady state vibration operations, the amount of fluid flowing into the vibrator unit each cycle must be equal to the volume of fluid flowing from the vibrator to the sump. In the conventional push-pull type of double acting piston and cylinder, after the piston has moved up by high pressure fluid applied below, for example, all of the fluid below the piston must be expelled to the sump. This expelled fluid must flow through the passages of the servo valve to the sump. The cross sectional area of these passages is not constant but varies as a function of time in accordance with the sweep signal. In any case whatever amount of work it takes to force the fluid through the outlet passages of the valve must be supplied by the fluid entering above the piston.

In the valve of this invention the same steady state material balance must be true, that the total volume of fluid flow into the valve in one cycle must be equal to the outflow in the same cycle. The outlet valve of this vibrator also varies as a function of time. However, this valve opening is controlled by the operation of the vibrator itself instead of the input sweep signal.

Figure 6:
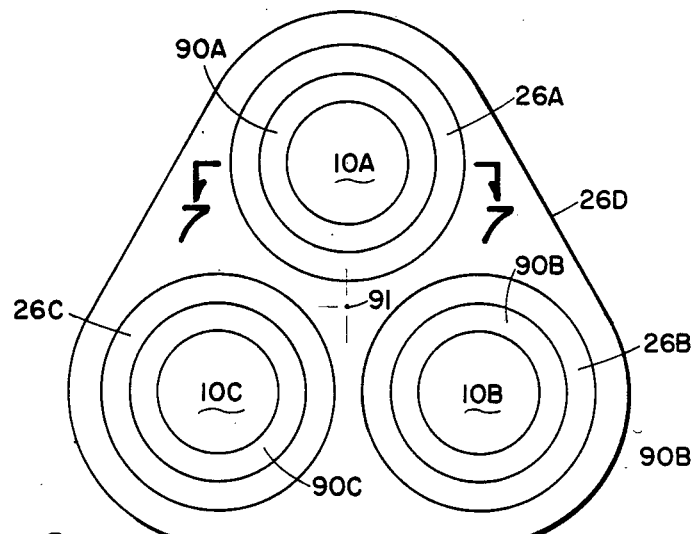
FIG. 6 illustrates schematically the use of a single, or multiple base plate.

One advantage of using the truck as the reaction mass is that the vibrator can be made small. Also since they are simple in construction, a plurality of vibrator units can be used in parallel. This is shown in FIG. 6 which illustrates schematically the use of (for example) three separate vibrator units 10A, 10B, 10C, each supported from the truck as in FIG. 5. These would be arranged symmetrically about a central point 91. Also the high pressure accumulator 42 can be positioned coaxially with axis 91, with the servo valve attached below, and with three short tubes radially connecting one to each of the three vibrators.

One of the difficulties of getting large base plate area, but with a control application of force, is that the baseplate must be made very heavy so as to move rigidly as a unit. With multiple vibrator units, the use of multiple points of application of force, such as 10A, 10B, 10C in FIG. 6, either as a single baseplate 26D, or three separate baseplates 26A, 26B and 26C can be used. With larger baseplate area more energy can be imparted into the earth.

Figure 8:
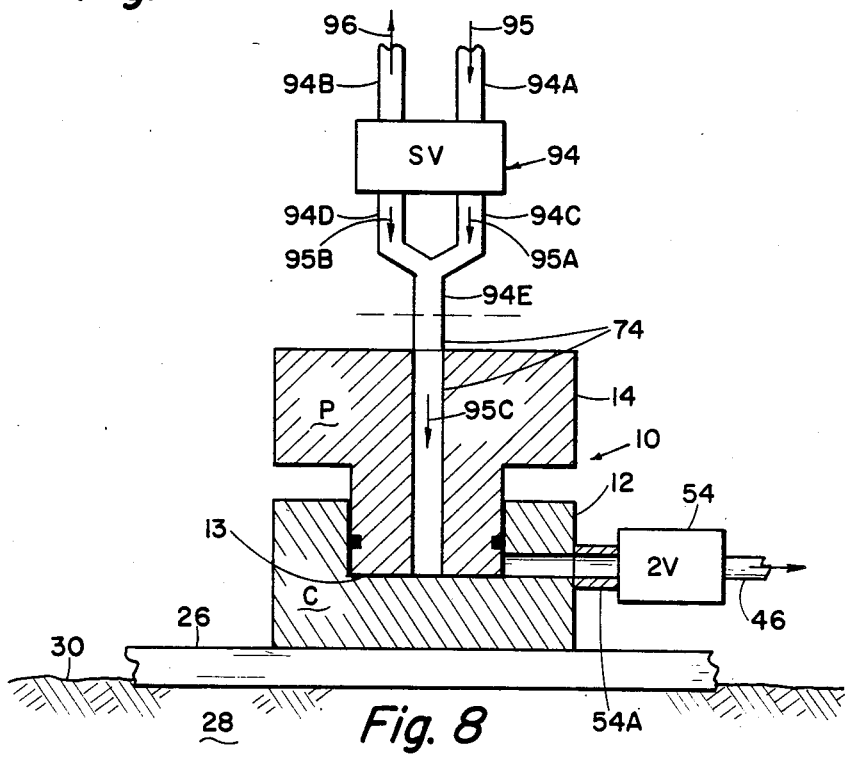
FIG. 8 illustrates schematically how it is possible to obtain double frequency from the vibrator, when using a conventional servovalve.

Of course, as the baseplate area increases, it becomes more difficult to set the baseplate down on a flat, level spot, particularly since these spots are designated by the surveyor. Thus, by the use of multiple smaller baseplates, and using such means as shown in FIG. 8 it is possible to adjust the plane of the baseplate to the slope of the ground.

Figure 7:
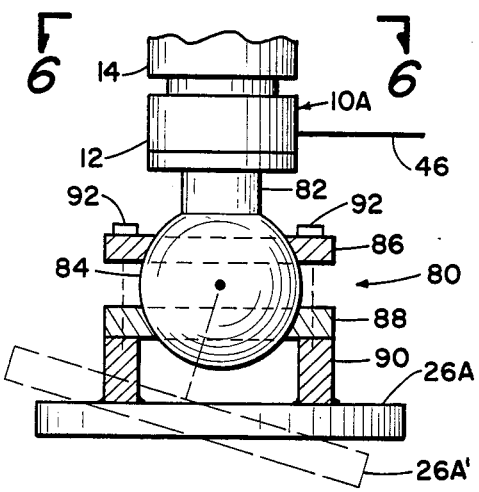
FIG. 7 illustrates apparatus for permitting adjustment of the plane of a base plate.

FIG. 7 shows as 10A the vibrator units with cylinder 12 and piston 14. The cylinder 12 is supported on stub column 82 and sphere 84. The sphere 84 is clamped by two rings 86 and 88 which are provided with internal spherical surfaces to match that of the sphere. These rings 86, 88 are clamped by means such as bolts 92 to a ring 90 welded to the baseplate 26A. The bolts should be tight enough that there is no vertical play, but rotary motion would be permitted under the weight of the truck 20.

In a conventional vibrator system where there is a double-acting piston and cylinder, driven by a servo valve, one half cycle of the servo valve piston connects pressurized fluid to one side of the piston, and sump to the other side, while in the second half of the cycle the high pressure is applied to the other side of the piston, and the sump to the first side. Thus, there are two successive pressure pulses generated in one cycle of the servo valve. In the conventional vibrator these operate on two opposed sealed spaces, forming a single cycle of the vibrator.

In this vibrator, in the time duration of each pressure pulse the single sealed space is pressurized and depressurized. Thus, the two sequential pressure pulses can be applied to the same space. This provides a frequency of operation of the vibrator which is twice the frequency of the cyclic operation of the valve.

This is very important since, at present, the upper limit of frequency of a vibrator is set by the servo valve. However, with this new vibrator, this limit has been doubled.

This is illustrated in FIG. 8 which shows schematically the connections to and from the servo valve and to and from the vibrator unit. The conventional seismic vibrational servo valve is indicated as 94. It has a high pressure fluid inlet 94A which would be connected to a H.P. accumulator, and an outlet of depressurized fluid 94B which would be connected to the sump. Flows would be in accordance with arrows 95A, 95B.

There are two secondary outlets 94C and 94D which alternately provide pulses of high pressure fluid to be injected alternately into one end and then the other end of a cylinder having a double acting piston. While a pressure pulse is produced at 94C, for example, depressurized fluid from the opposite end of the cylinder flows into 94D and out of 94B, and so on.

As shown in FIG. 8 the two secondary outlets 94C, 94D are connected through 94E to the vibrator 10, inlet opening 74. The outlet of the vibrator unit is, of course, the second valve 54.

While I show in FIG. 3 only a single opening 62 from the space 72, it will be clear that more than one such opening 62 can be utilized in parallel, spaced around the circumference of the cylinder.

Also while I show the piston P connected to the truck 20 and the cylinder C connected to the baseplate, the connections could of course be reversed, as desired.

In conventional usage the word vibrator is thought to mean the piston/cylinder, and the reaction mass and baseplate. In this description I call this a vibrator system and by the words vibrator unit, I designate the piston/cylinder, or flexible sealed container.

In FIG. 5 I show the vibrator 10 rigidly attached to the truck bed 20. This is schematic only, and as a practical matter it may be desirable to free the vibrator from rigid, nonremovable connection to the truck, and to provide means to rigidly clamp and unclamp the vibrator to the truck while operating, such as, for example, as shown in U.S. Pat. No. 3,789,951.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. An improved vibrator system for seismic geophysical prospecting, comprising:
   (a) a vibrator comprising a first part, or dynamic vibrator part (VD) attached to a base plate in contact with the earth and a second part or vibrator stationary part (VS) attached to a reaction mass providing a sealed space between said VD and said VS;
   (b) a cyclically driven first valve for controlling the inflow of pressurized fluid to said sealed space as a selected function of time;
   (c) a second valve for controlling the outflow of fluid from said sealed space as a selected function of the displacement D between said VD and said VS;
   (d) a source of high pressure fluid, and a sump for low pressure fluid, and a pump means connected between said sump and said source; and
   (e) means to connect said first valve between said source and said sealed space, and means to connect the said second valves between said sealed space and said sump.

2. The vibrator as in claim 1 including means to hold said base plate in contact with the earth.

3. The vibrator as in claim 2 in which said means comprises the weight of a large mass pressing on said baseplate through compliance means.

4. The vibrator as in claim 3 in which said large mass comprises at least a part of the vehicle used for transporting said vibrator.

5. The vibrator as in claim 1 in which said first valve comprises an electrohydraulic servo valve.

6. The vibrator as in claim 1 in which the flow control of said second valve is proportional to the spacing between said VD and said VS.

7. The vibrator as in claim 5 and including a self-contained reaction mass attached to said VS.

8. The vibrator as in claim 1 including means between said VD and said baseplate to permit the plane of the baseplate to rotate through a selected small angle with the horizontal.

9. The vibrator as in claim 8 in which said means comprises a clamped spherical coupling.

10. The vibrator system as in claim 1 and including at least two vibrators with the VS of each one attached to the truck frame, and the VD of each one connected to a baseplate.

11. The vibrator as in claim 10 in which each VD is connected to a separate baseplate.

12. The vibrator as in claim 10 in which said at least 2 VD are connected to a single baseplate.

13. The vibrator as in claim 10 and including at least three vibrators arranged in an equilateral triangular relation.

14. A vibrator system comprising:
   at least one vibrator unit comprising two parts reciprocal with respect to each other and enclosing a sealed space;
   an inlet opening to said sealed space controlled by a first valve means for receiving timed pulses of pressurized fluid; and
   a vibrator unit outlet opening for expelling depressurized fluid from the sealed space and in which the first valve is an electro-hydraulic servo valve driven by a selected oscillatory electric signal and in which said first valve has a first opening for receiving high pressure fluid and a first outlet for expelling depressurized fluid and two secondary outlets for alternately expelling pulses of pressurized fluid said two secondary outlets being connected in parallel to said inlet opening of said vibrator unit and in which said first outlet opening of said vibrator unit is connected to a sump whereby said vibrator unit is operated at double the frequency of said electrical signal.

15. The vibrator system of claim 14 including:
   a second valve between said vibrator unit outlet opening and said sump.

16. The vibrator system of claim 15 in which the outlet area of said second valve is controlled as a function of the separation between said two parts of said vibrator unit.

17. The vibrator system of claim 15 in which the opening of said second valve is controlled as a linear function between said two parts of said vibrator unit.

18. The vibrator system of claim 15 in which the opening of said second valve is controlled as a nonlinear function between said two parts of said vibrator unit.

19. A seismographic vibrator system comprising:
   at least one vibrator unit comprising two parts reciprocal with respect to each other and defining a sealed space therebetween having an inlet opening for receiving timed pulses of pressurized fluid and an outlet opening for expelling depressurized fluid from said sealed space; and
   an electrohydraulic servo valve having an inlet opening connected to receive pressurized fluid and two output openings for alternately expelling pulses of pressurized fluid, said valve outlet openings being connected in parallel to said inlet opening of said vibrator unit and said vibrator unit outlet opening being connected to a sump through a second valve, whereby said vibrator unit operates at twice the frequency of the operation of said servo valve.

20. The system as in claim 19 in which said second valve has a variable opening which varies as a function of the spacing between said two parts.

21. The system as in claim 19 including means to clamp one part of said vibrator unit to the frame of a carrier vehicle.

22. The system of claim 19 including means to flow pressurized fluid unidirectionally through said servo valve, said vibrator unit and said second valve to said sump.

* * * * *